J. D. MARTENS.
AGRICULTURAL IMPLEMENT.
APPLICATION FILED AUG. 10, 1912.
1,078,792.
Patented Nov. 18, 1913.
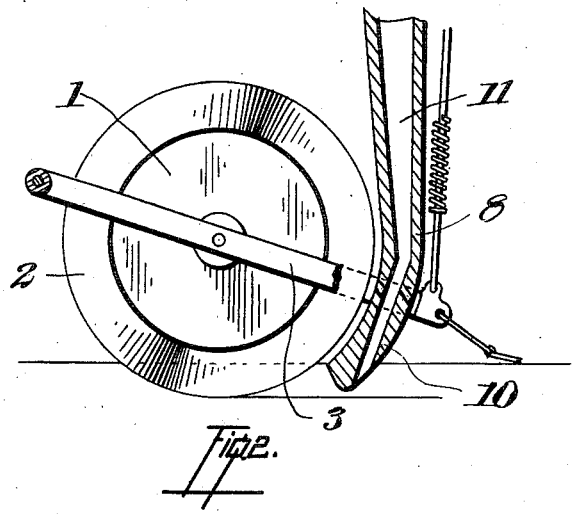
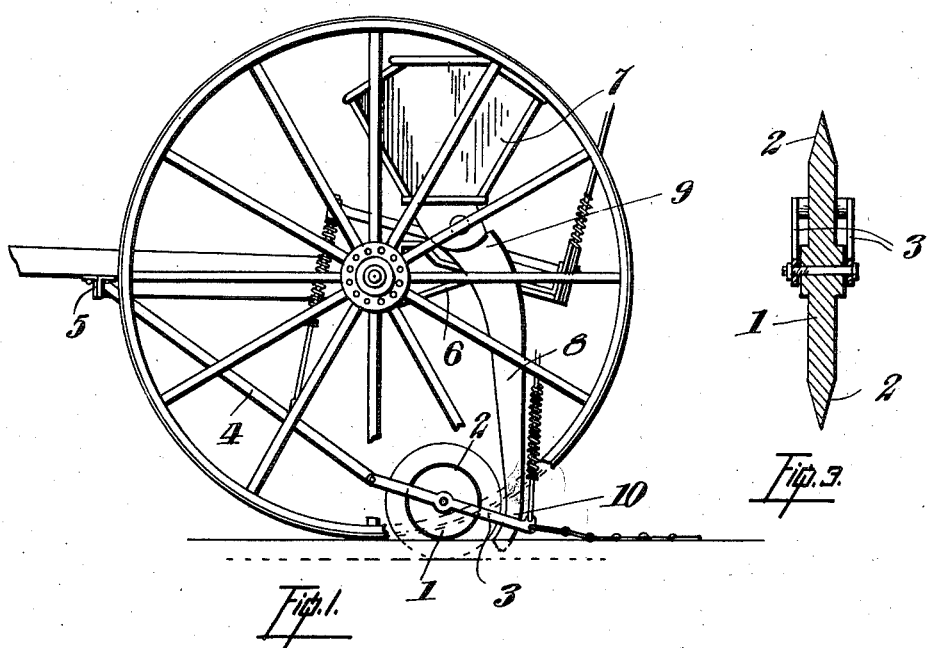
WITNESSES
INVENTOR
J.D. MARTENS.
BY Fred B. Fetherstonhaugh
ATT'Y.

UNITED STATES PATENT OFFICE.

JOHN D. MARTENS, OF SWIFT CURRENT, SASKATCHEWAN, CANADA.

AGRICULTURAL IMPLEMENT.

1,078,792.  Specification of Letters Patent.  Patented Nov. 18, 1913.

Application filed August 10, 1912. Serial No. 714,441.

*To all whom it may concern:*

Be it known that I, JOHN DAVID MARTENS, a subject of the King of Great Britain, and resident of Swift Current, in the Province of Saskatchewan, in the Dominion of Canada, have invented certain new and useful Improvements in Agricultural Implements, of which the following is the specification.

My invention relates to improvements in agricultural implements and more particularly to seeders and the object of the invention is to devise a disk harrow having means for sowing the seeds in the furrows made by the harrow instead of having to sow the seeds independently by hand or by another seeding implement.

The invention consists of a plurality of harrow disks suitably mounted on a frame and a plurality of seed chutes immediately behind the disks, communicating with a seed receptacle on top of the frame whereby the seeds from the receptacle pass down the chutes and fall in the furrows made by the harrow disks immediately behind the same, all as hereinafter more particularly described and illustrated in the accompanying drawing in which:—

Figure 1 represents a side view of a device constructed according to my invention. Fig. 2 is an enlarged side view thereof showing one of the chutes in section, and Fig. 3 is a cross section of one of the disks.

Like characters of reference indicate corresponding parts in each figure.

1 are the harrow disks having the V-shaped outer peripheries 2.

3 are frames surrounding the disks 2 to which the disks are pivoted.

4 are suitable connections to a cross bar 5 extending laterally of the implement.

6 is the frame of the implement, and 7 is the seed receptacle.

8 are chutes having forwardly curved upper and lower extremities 9 and 10 respectively, and situated behind the disks.

11 are orifices extending through the chutes. The upper extremities of the chutes are pivotally connected to the bottom of the seed receptacle 7.

The operation of the device is as follows: When the implement is drawn along the harrow disks cut furrows into which the seeds drop through the chutes 8 from the seed receptacle 7. Any well known means can be employed for closing the furrows after the seeds have been down. The lower ends of the chutes being forwardly inclined and extending near the bottom of the furrows direct the seeds therein and prevent the same being scattered by the wind as frequently occurs.

What I claim as my invention is:

In a seeder the combination with a disk of a seed chute behind the disk having forwardly curved upper and lower extremities and a seed receptacle above the chute, said upper extremity of the seed chute being pivotally connected to the bottom of the seed receptacle and communicating therewith, and a frame extending around the disk and pivotally connected thereto.

In witness whereof I have hereunto set my hand in the presence of two witnesses.

JOHN D. MARTENS.

Witnesses:
PERCY STUBBS,
MABEL HUTCHINSON.